United States Patent
Gilks et al.

(10) Patent No.: US 11,196,457 B2
(45) Date of Patent: Dec. 7, 2021

(54) DIGITAL SUBSCRIBER LINE INTERFERENCE IDENTIFICATION

(71) Applicant: BRITISH TELECOMMUNICATIONS PUBLIC LIMITED COMPANY, London (GB)

(72) Inventors: Daniel Gilks, London (GB); Philip Bull, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 0 days.

(21) Appl. No.: 16/969,674

(22) PCT Filed: Feb. 12, 2019

(86) PCT No.: PCT/EP2019/053436
§ 371 (c)(1),
(2) Date: Aug. 13, 2020

(87) PCT Pub. No.: WO2019/158526
PCT Pub. Date: Aug. 22, 2019

(65) Prior Publication Data
US 2021/0013926 A1   Jan. 14, 2021

(30) Foreign Application Priority Data
Feb. 15, 2018 (EP) .................................... 18156995

(51) Int. Cl.
*H04B 3/32* (2006.01)
*H04B 3/487* (2015.01)
*H04B 3/54* (2006.01)

(52) U.S. Cl.
CPC ............... *H04B 3/32* (2013.01); *H04B 3/487* (2015.01); *H04B 3/54* (2013.01)

(58) Field of Classification Search
CPC ............. H04B 3/32; H04B 3/487; H04B 3/54
See application file for complete search history.

(56) References Cited

U.S. PATENT DOCUMENTS

| 9,525,460 | B1* | 12/2016 | Vazquez | .................. H04B 3/48 |
| 9,634,720 | B2 | 4/2017 | Schwager et al. | |
| 2006/0072722 | A1 | 4/2006 | Savoor et al. | |
| 2008/0190639 | A1 | 8/2008 | Baran et al. | |

(Continued)

FOREIGN PATENT DOCUMENTS

| CN | 1535513 | 10/2004 |
| CN | 1757173 | 4/2006 |

(Continued)

OTHER PUBLICATIONS

International Search Report and Written Opinion of the ISA for PCT/EP2019/053436, dated Mar. 13, 2019, 12 pages.

(Continued)

*Primary Examiner* — Dac V Ha
(74) *Attorney, Agent, or Firm* — Nixon & Vanderhye P.C.

(57) ABSTRACT

Interference on DSL (Digital Subscriber Lines) systems can be identified by collecting modem data and determining, for a plurality of time intervals, whether the line is carrying traffic and/or whether there are errors on the line. The presence of interference can be inferred from the correlation of the traffic data and the error data.

19 Claims, 8 Drawing Sheets

(56) References Cited

U.S. PATENT DOCUMENTS

| | | | |
|---|---|---|---|
| 2008/0247537 A1* | 10/2008 | Henry | H04B 3/32 |
| | | | 379/416 |
| 2009/0225672 A1 | 9/2009 | Yi et al. | |
| 2013/0044828 A1 | 2/2013 | Jiang et al. | |
| 2014/0105262 A1 | 4/2014 | Alloin et al. | |
| 2014/0112380 A1* | 4/2014 | Sands | H04B 3/32 |
| | | | 375/222 |
| 2014/0369430 A1 | 12/2014 | Parnell | |
| 2015/0009793 A1 | 1/2015 | Schwager et al. | |
| 2015/0365256 A1 | 12/2015 | Afkhami et al. | |
| 2017/0295044 A1 | 10/2017 | Oksman | |
| 2018/0076851 A1* | 3/2018 | Oksman | H04L 25/085 |
| 2018/0109289 A1* | 4/2018 | Alloin | H04B 3/32 |
| 2018/0343068 A1* | 11/2018 | Afkhami | H04B 3/542 |

FOREIGN PATENT DOCUMENTS

| | | |
|---|---|---|
| CN | 1968330 | 5/2007 |
| CN | 101019333 | 8/2007 |
| CN | 101536343 | 9/2009 |
| CN | 101772901 | 7/2010 |
| CN | 102349239 | 2/2012 |
| CN | 102714678 | 10/2012 |
| CN | 106134169 | 11/2016 |
| CN | 106330258 | 1/2017 |
| EP | 3 242 410 | 5/2020 |
| WO | 2007/055962 | 5/2007 |
| WO | 2014/011191 | 1/2014 |

OTHER PUBLICATIONS

Extended Search Report for EP18156995.5, dated Apr. 12, 2018, 9 pages.
Examination Report for GB 1802476.0, dated Jun. 5, 2020, 3 pages.
Combined Search and Examination Report for GB1802476.0, dated Aug. 16, 2018, 8 pages.
Office Action dated Mar. 29, 2021 issued in Chinese Application No. 201980013428.0 (9 pages) and Translation (13 pages).

* cited by examiner

DIGITAL SUBSCRIBER LINE INTERFERENCE IDENTIFICATION

This application is the U.S. national phase of International Application No. PCT/EP2019/053436 filed 12 Feb. 2019, which designated the U.S. and claims priority to EP Patent Application No. 18156995.5 filed 15 Feb. 2018, the entire contents of each of which are hereby incorporated by reference.

BACKGROUND AND SUMMARY

The present invention relates to identifying interference on digital subscriber line (DSL) services (such as ADSL, VDSL or G.fast), hereinafter DSL or xDSL.

It is well known to use legacy (or newly installed) copper wires originally used for analogue telephone services for last-mile transmission of broadband or DSL signals to and from premises. Such signals are susceptible to a variety of types of noise and interference and modems at each end negotiate a transmission rate based on signal-to-noise ratio and may resynchronise if transmission conditions change. Noise can come from a variety of sources, including crosstalk between adjacent cables to neighboring premises, external noise, and noise generated by electrical equipment within a premises, and may vary with time. By its very nature, the source of such noise is not generally known, nor can it be reliably predicted.

It has been appreciated that in some premises, power-line transmission (PLT), which is a technology used to transmit data within a premises over power-lines as an alternative to dedicated Ethernet cables or 802.11 WiFi signaling, may produce its own interference (PLTI) which materially affects the DSL signal. The potential issue of PLT-to-DSL crosstalk has been generally appreciated, and PLT modems are sometimes configured to take this into account and to try to reduce interference.

Some methodologies exist for identifying the presence of both PLT and PLTI, typically to solve the problem of PLT optimization. PLTI could be detected by studying the spectral noise characteristics of in-sync modem(s). Examples of prior art which generally addresses the issue of interference between DSL and PLT include EP-A-3242410, US-A-2015/0365256, U.S. Pat. Nos. 9,634,720, 9,525,460 and US-A-2008/190639.

However, existing techniques, primarily aimed at test equipment or for deployment in bespoke individual modems, are not promising for a network operator seeking to identify the problem of PLT/DSL interference on a network which is likely to have a mixed population of modems etc., and it is not particularly practical to install dedicated modems across a sizable network in place of pre-installed equipment. Thus network operators have not generally been able to identify PLTI usefully in diagnosis or determination of DSL interference, other than by deploying dedicated equipment at a test site.

Another document, US2014/0105262, relates to a method and apparatus for detecting and characterizing noise and other events affecting a communications system such as DSL. According to certain aspects, the technique includes a noise analysis engine that is embedded in customer premises equipment that classifies noise sources according to their specific characteristics and tracks each noise source in a dynamic manner, in such a way as to provide visibility to the changing noise environment within the customer premises and/or report this environment to a remote entity.

Pursuant to the invention it has been appreciated that a novel method may make it possible and useful to identify the presence and impact of generated interference (PLTI) on a DSL signal, which may be useful for DSL diagnostics and analysis by a network operator. This can be used to inform signaling and/or network remedies; for example if it is known that PLTI dominates external interference at a particular premises, steps taken to reduce external interference may show limited improvement in signal-to-noise or error-rate or reliable bandwidth. The method may be performed at a network head-end to diagnose a situation at a customer premises remotely (although the method may also be run at a customer modem and results reported either locally or remotely).

According to a first aspect, the invention provides a method of determining the presence of power-line transmission interference (PLTI) on a digital subscriber line (DSL) connecting a network to a customer premises, the method comprising:
collecting, at a modem via which data carried by the digital subscriber line passes, modem data in respect of data communication on the digital subscriber line, the modem data being collected for a series of time intervals;
determining from the collected modem data at least one traffic measure indicative of data throughput on the digital subscriber line for each time interval;
determining from the collected modem data at least one noise measure indicative of errors or noise in the data carried by the digital subscriber line for each time interval;
correlating the traffic measures and noise measures for a plurality of said time intervals; and
determining the presence of power-line transmission interference based on the results of a plurality of said correlations.

The method may be performed based on modem data obtained by the network, with the step of determining the presence of power-line transmission interference relating to the determining the presence of power-line transmission interference originating at the customer premises. Thus remote or central detection of PLTI may be achieved without needing an engineer to visit a premises or to install dedicated equipment or bespoke modems.

The modem data may be collected, at least in part, by the network from a head-end modem, and/or the modem data may be collected, at least in part, from physical layer operations administration and maintenance (PLOAM) statistics and/or other standard data reported by a modem within the customer premises. Again, this avoids the need for bespoke modems at the customer premises.

The at least one noise measure may be determined from at least one reported modem parameter selected from:
errored seconds;
successful and/or unsuccessful resync counts;
max attainable rate;
signal-to-noise ratio margin (SNR margin).

The at least one noise measure may be determined based on a plurality of reported modem parameters. Additionally or alternatively a plurality of noise measures may be determined. A plurality of correlations may be performed to determine the presence of power-line transmission interference.

A change in synchronized rate or maximum attainable rate may be detected and a reduction in rate may be determined to be indicative of noise. The time intervals may generally be equal and between 1 minute and 30 minutes, preferably about 15 minutes.

The time intervals may be flagged as considered likely to exhibit power-line transmission interference when a positive correlation above a threshold between the noise measure and the traffic measure is determined. A digital subscriber line may be flagged as likely to be experiencing power-line transmission interference when time intervals are flagged over a plurality of days, for example over at least 2 out of 3 days or on at least two consecutive days.

Parameters for use in determining the presence of power-line transmission interference may be adjusted based on an independent input indicative of the likelihood of power-line transmission interference at a particular customer premises. For example, if a premises is investigated and an engineer identifies power-line transmission equipment or detects interference, or if a customer provides information indicating whether they do or do not employ PLT equipment, not only might the flagging of that line be updated, but the information may be used to update thresholds or algorithms which determine whether or not PLTI is present for other lines.

The method may comprise adjusting a DSL profile or parameter or sending a signal to a modem to adjust a profile or parameter in response to determining the presence of power-line transmission interference. For example, if PLTI is present, a DSL profile may be selected which is less susceptible to PLTI.

The method may be repeated for a plurality of digital subscriber lines connected to a network and parameters for use in determining the presence of power-line transmission interference may be adjusted following said repeating. For example, the thresholds may be updated based on measurements from multiple lines.

Another aspect provides a computer program or computer program product comprising instructions for performing a method according to any method aspect.

Advantageously the method can be used at a service provider's central office or "exchange" using only the data types provided by standard DSL Physical Layer reporting statistics, unlike a range of PLT devices based or modem chipset-based analysis techniques which require much more fine-grained data and richer data-types which are not available at a network reporting level.

Advantageously, the method need not place further data or computation requirements on either modem in the DSL service, so can be performed using conventional modem hardware without further resource requirement at the network device.

BRIEF DESCRIPTION OF THE DRAWINGS

An embodiment of the invention will now be described, by way of example only, with reference to the accompanying drawings, in which.

DETAILED DESCRIPTION OF PRESENT EXAMPLE EMBODIMENTS

Figure 1:
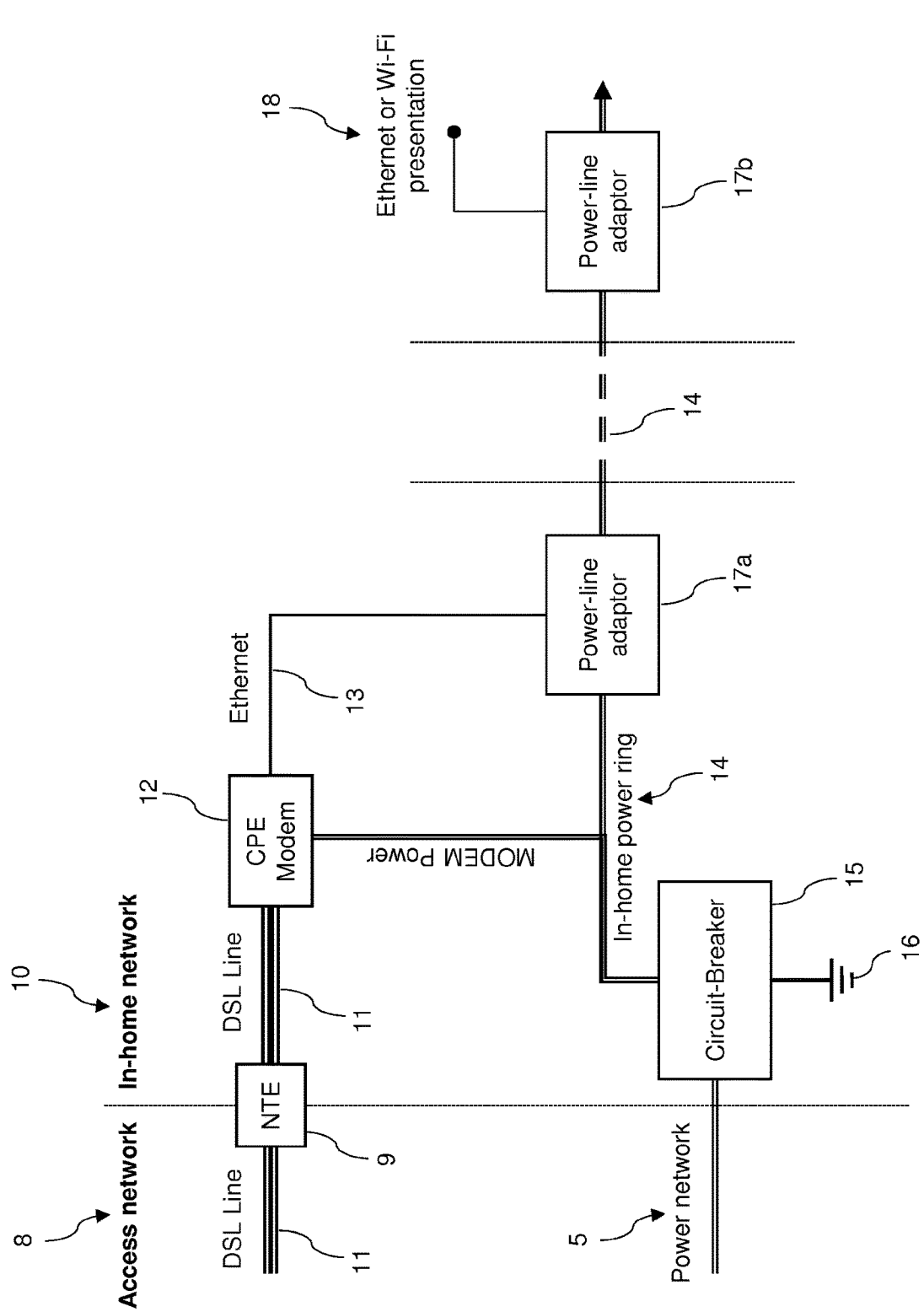
FIG. 1 depicts a typical network topology using power-line adapters.

Embodiments of the invention may be designed to work primarily with standard VDSL and G.fast network equipment where the operating frequency range of the DSL service has significant overlap with many standard PLT systems, but this methodology would be applicable to other DSL technologies or through the application of non-standard network testing equipment or modem hardware.

Another potential advantage is that the method may identify the general performance of the DSL link rather than performance of the in-home network or the overall IP session.

By analyzing aggregate usage patterns a PLTI detector according to an embodiment may be able to derive DSL service impact directly from the diagnostic outcomes providing not only detection, but also clarity over the required next steps to mitigate the impact of PLTI on a user's service.

Advantageously, the method according to a preferred embodiment may use Physical Layer Operations Administration and Maintenance (PLOAM) Statistics. These are captured and reported by DSL modem(s) as specified by ITU-T G.993.2 (VDSL and ADSL) and ITU-T G.997.2 and ITU-T G.9701 (G.fast), thus advantageously no specialized programming is required for the modems.

Methods are disclosed which identify correlations between elevated DSL traffic and reduced DSL channel capability indicators and/or correlations between elevated DSL traffic and increased symptomatic channel stress indicators to extract the impact and patterns of traffic induced interference in the DSL system.

In a preferred application the method correlates DSL layer traffic statistics (indicating usage) with key channel capability and stress indicators over a sequence of periods (typically of 15 minutes to multiple hours of use).

Where strong relationships between usage and degraded channel capability or increased line stress can be identified it can be determined that high levels of network usage are directly impacting the DSL service through increased levels of line interference. One of the highly likely causes of such self-induced interference would be that significant data volumes are being passed over an in-home power-line transmission system and this is injecting noise into the DSL service either through co-location of power-lines with the DSL cable, or directly through the power network via the modem power supply. This allows a diagnosis of either service impacting or non-service impacting PLTI to be established.

Channel capability indicators represent the state of a DSL line, and its ability to transmit data. These generally include signal-to-noise ratio (SNR), signal-to-noise ratio margin (SNRM), achieved data rates and maximum-achievable (or "max attainable") data rates. These values are generally reported as a spot value within a time period, these parameters indicating the quality of the DSL link and the related trade-offs between rate and stability in the DSL layer. Channel stress indicators include a wide range of reported parameters at the DSL layer including forward error corrections, retransmission statistics, errors, seamless rate adaption events and fast rate adaption events, loss of sync, and failed re-sync processes. These parameters show shocks to the DSL layer performance and indicate the impact of time-varying line conditions on the user.

PLTI is of particular interest to DSL service providers as this is likely to be self-induced interference, precisely when a service user is attempting to use high-value broadband services including IPTV services.

In recent years the number and variety of network-enabled devices has increased rapidly. This has created challenges in distributing connectivity between the Customer Premise Equipment (CPE) router/access point to multiple devices around the home/business.

Most new network-enabled devices will now accept a Wi-Fi connection, whilst older devices may require connection via a wired LAN. Generally residential and business customers are reluctant to extend Ethernet cables around their homes and Wi-Fi signal strength can often become a limiting factor as a result of local conditions, including the number of spatially competing Wi-Fi access points, the physical premise build and the number of devices competing for bandwidth and/or using different Wi-Fi standards.

A common solution for local area connectivity over the past decade has been to transmit data across the local network using power-line adapters which can either present a wired or wireless interface at a secondary location, distant from the primary router, as can be seen in FIG. 1.

As depicted in FIG. 1, a CPE modem 12 is connected to and is generally near or co-located with the network terminating equipment (NTE) 9 which provides the in-home DSL line 11 presentation for the CPE modem 12 within the in-home network 10 from the DSLAM modem (not shown) of the (external) access network 8. The CPE modem 12 receives operating power from the in-home power distribution ring 14 which should be protected from the external power network by a circuit breaker 15 and ground cable 16. The CPE modem 12 generally hosts an outbound array of LAN ports and likely a Wi-Fi access point to provide data connectivity for devices around the home. To extend the availability of this access point a pair of power-line adapters 17a, 17b have been placed on the internal power network 14. These devices can pass data at high frequencies over the internal power network 14. At the CPE modem 12, an Ethernet LAN link 13 is made from the modem 12 to the first power-line adapter device 17a. At the remote power-line adapter device 17b an Ethernet or Wi-Fi presentation 18 can be implemented to effectively extend the service of the CPE modem 12 at a different point in the premise.

Power-line adapters are typically deployed in pairs; with a device located in proximity to the CPE modem or at least at a location where an Ethernet termination can be made from the CPE modem, and a secondary device in a remote location coupled through the power distribution network.

Power-line adapters use a broad frequency spectrum which overlaps with the VDSL and G.fast band to transmit data over the in-home mains power network in a similar way to the DSL connection in the Access network.

In certain circumstances the power-line transmission (PLT) signal generated between two power-line adapters can be picked up by the DSL line as interfering electrical noise, causing power-line transmission interference (PLTI). This can either be a result of close proximity between power and DSL lines, or through direct coupling at the CPE modem via the modem power supply.

The impact of PLTI on a DSL can be severe, causing a loss of sync, significant reductions in achievable sync rate and/or generating DSL errors. As such, detecting the presence, severity and timings of PLTI is essential for delivering high-quality broadband services to a customer's applications and end-devices and allows a significantly improved assessment of in-premise network behavior for the purposes of accurately dispatching engineers and providing feedback to customers.

As noted above, there are power-line modems which do try to take into account DSL crosstalk and some of those methods could in principle be extended to use in a network. However currently implemented quiet line noise (QLN) is unlikely to identify PLTI as this is captured infrequently in the G.fast technologies and only on resync in VDSL and ADSL technologies. Future implementations of active line noise (ALN) in G.fast technologies may provide more assistance, however the rate of reporting for spectral data objects is likely to remain considerably lower than for the singleton, aggregate data objects. In terms of diagnostic systems for this case it remains unclear whether high temporal resolution or high frequency resolution is more helpful. If both data types were available a combined diagnostic algorithm could be implemented. However this embodiment takes a different approach.

The main purpose of the present embodiment is to identify the characteristics of self-induced PLTI in the DSL line or modem used to serve a customer from the standard DSL reporting parameters.

The proposed solution uses a broad array of reporting metrics from the standard DSL PLOAM parameters. The exact details of these values are not explicitly essential, as what is required is a suite of data which allows channel capability and channel stress to be established over time. Many of the reporting parameters are highly interrelated so it is not always possible to clearly identify PLTI directly from a single data field. This analysis requires an extended time series of data to be available for analysis so temporal variation in line behavior can be identified and understood. It will be appreciated that standards will evolve during the lifetime of this patent (application) and equivalents of the specific steps and measures and parameters disclosed herein may be substituted by others which will enable interference to be determined in an analogous manner.

Figure 2:
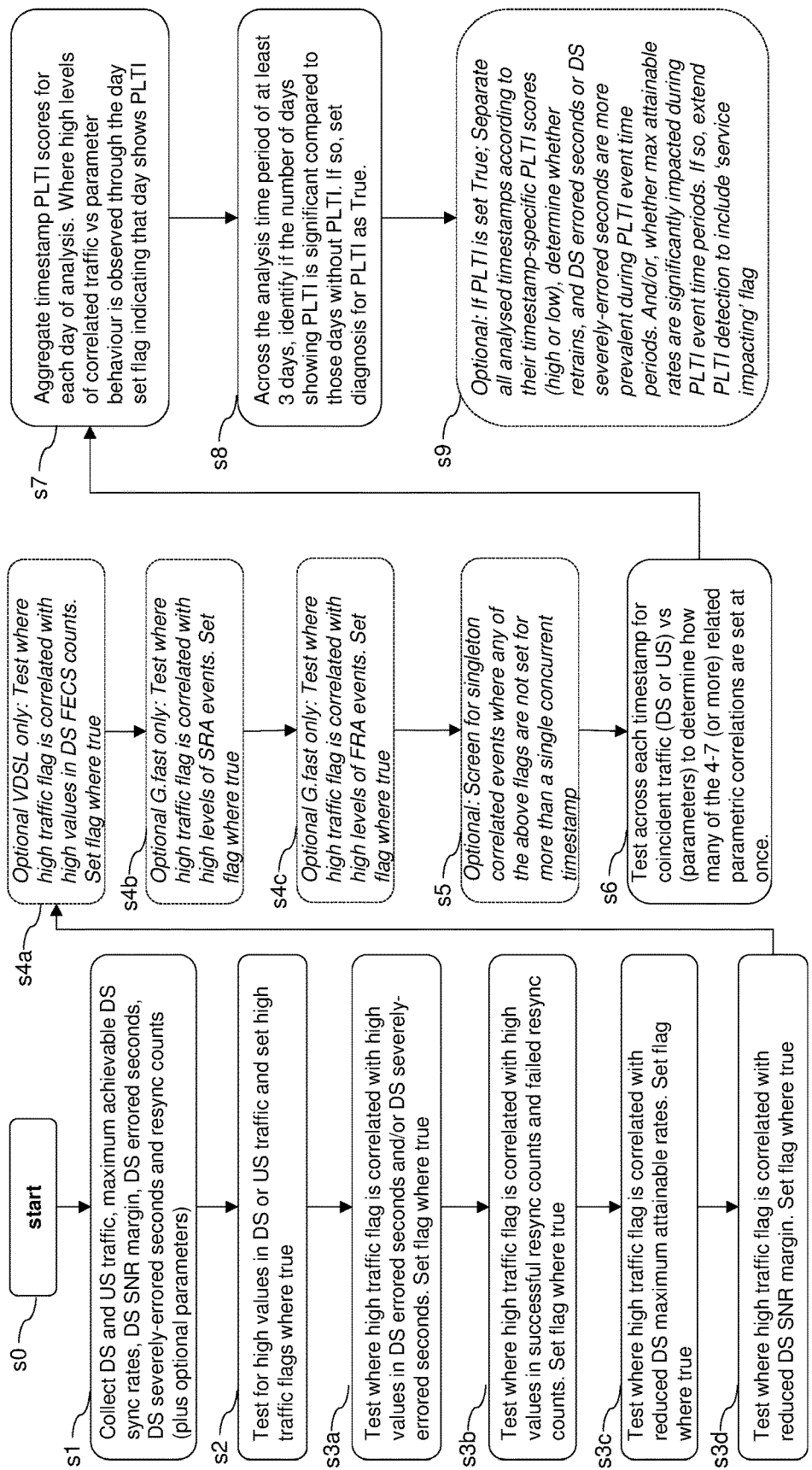
FIG. 2 depicts a process flow for an embodiment of the invention, including various optional implementation features.

The process according to this embodiment is as follows—see also FIG. 2.

Start (i.e. Step s0):

Step s1) Collect Downstream (DS) and Upstream (US) traffic data, maximum attainable DS sync rates, DS SNR margin, (DS FECS—Optional), (DS SRA events—Optional), (DS FRA events—Optional), DS errored seconds, DS severely-errored seconds, Successful resync counts and Failed resync counts.

Step s2) Test for high values in traffic, either DS or US through time and set a flag with timestamps where high traffic levels are identified.

Step s3a) Test for high values in DS errored seconds and/or DS severely-errored seconds, and flag where high values in errored second counts are associated with high values in traffic data.

Step s3b) Test for high values in successful resync counts and/or failed resync counts, and flag where high resync counts are associated with high values in traffic data.

Step s3c) Test for reduced values in DS max attainable rates, flag where reduced values in DS max attainable rates are associated with high values in traffic.

Step s3d) Test for reduced values in DS SNR margin, flag where reduced values in DS SNR margin are associated with high values in traffic.

Step s4a) Optional: VDSL only (Test for high values in DS FECS counts, and flag where high values of DS FECS counts are associated with high values in traffic data).

Step s4b) Optional: G.fast only (Test for high levels of DS SRA events, and flag where high levels of DS SRA events are associated with high values in traffic data).

Step s4c) Optional: G.fast only (Test for high levels of DS FRA events, and flag where high levels of DS FRA events are associated with high values in traffic data).

Step s5) Optional: (Screen for singleton correlated events where any of the above flags are not set for more than a single concurrent timestamp).

Step s6) Test across each timestamp for coincident traffic (DS or US) vs (parameters) to determine how many of the preferably 4-7 (or more where available) related parametric correlations are set at once. Set a mapping to score the related sets of parameter correlations to form timestamp-specific PLTI scores.

Step s7) Aggregate timestamp PLTI scores for each day of analysis. Where high levels of correlated traffic vs parameter behavior is observed through the day set flag indicating that day shows PLTI.

Step s8) Across the analysis time period of at least 3 days, identify if the number of days showing PLTI is significant compared to those days without PLTI. If so, set diagnosis for PLTI as True.

Step s9) Optional: (If PLTI is determined to be True; Assess service impact by separating all analyzed timestamps according to their timestamp specific PLTI scores (high or low), determine whether retrains, and DS errored seconds or DS severely-errored seconds are more prevalent during PLTI event time periods. Or, whether max attainable rates are significantly impacted during PLTI event time periods. If so, extend PLTI detection to include 'service impacting' flag).

The characterization of certain steps as "optional" relates merely to their status as "optional" in relation to the present embodiment. It does not mean (so should not be taken to imply) that other steps are non-optional in relation to other embodiments of the invention—it merely implies that they are considered non-optional in relation to the present embodiment.

The above steps are discussed in more detail below.

Step s1) Collect Downstream (DS) and Upstream (US) traffic data, maximum attainable DS sync rates, DS SNR margin, (DS FECS—Optional), (DS SRA events—Optional), (DS FRA events—Optional), DS errored seconds, DS severely-errored seconds, Successful resync counts and Failed resync counts.

The data components required are produced within the access network modem plant equipment and are generally handed back through the network for storage and analysis.

This embodiment relies on a DSL modem being interrogated to expose performance data back to a management system. Access to timely parametric data is ideal for identifying the current state of a DSL line, but this particular embodiment also relies on time series analysis over a period of multiple days. It therefore requires data storage and availability rather than simply current parameter values.

The data gathered to analyze PLTI is based on making three key assertions about the line state. Firstly, when was the DSL line in heavy use? Secondly, when was the DSL line operating in a condition of stress? Thirdly, when was the DSL line operating below normal performance? If these time-periods can be identified the final PLTI assessment is determined by identifying that DSL line usage is correlated with a degradation in line performance.

The first question, "when was the DSL line in heavy use?" is a proxy for identifying periods of time where PLT is likely to have been used and active within the home network. This is based on an assumption that most home network usage of PLT is heavily skewed towards downstream data transfer (Media, IPTV, BT Vision etc.) over human usage time periods, i.e. half-an-hour for a short television program to two-to-three hours for a film or major sporting event.

A determination of when a DSL line was in use can be made through a count of ATM packets at the DSL layer (ideally in the Downstream and Upstream channel). This data is provided by G.fast modems and some VDSL modems. This data type gives no information about the types of service or content being served, only that valid data is provided over the DSL link.

The ability to understand the behavior of the home internet gateway could allow a better identification of PLT usage, either through direct analysis of power and keep-alive signatures from the attached PLT devices, or by passing more specific IP layer traffic details for the in-home (wireless) Local Area Network ((W)LAN) to give a much clearer picture of usage patterns and the likelihood and timings of PLT usage.

Secondly, "when was the DSL line operation in a condition of stress?" can be answered by a number of parameters depending on the technology type and the level of severity of interference. Where a line is operating with an elevated interference level it would be expected to observe DSL errors, and potentially re-sync processes. Forward error corrections (in VDSL), seamless rate adaption (in G.fast) or fast rate adaption (in G.fast) may also be observed.

If the above parameters and protocols are executed as expected the errors and resyncs are likely to be service-impacting for the customer, whereas the other parameters should not lead to service impact but still give a view of line stress.

Finally, the performance of the DSL line can be understood by analyzing maximum attainable sync rates and signal-to-noise ratio (SNR) margin. These two parameters give a view of the level of line protection set aside to mitigate time varying interference conditions through line-profiling and can demonstrate points in time where rate and margin have been traded against one another to maintain stability on the line (at the expense of rate). Maximum attainable sync rates remove the impact of network behavior and product design from understanding the physical performance of the DSL line.

When analyzing the line stress and line condition indicators to identify PLTI focus is placed on the downstream parameters. It is expected that PLT networking devices will be used in the customers premise. Therefore the impact of PLTI is much more significant on the previously attenuated (path from DSLAM to premise) downstream link than the locally inserted upstream channel.

Figure 3:
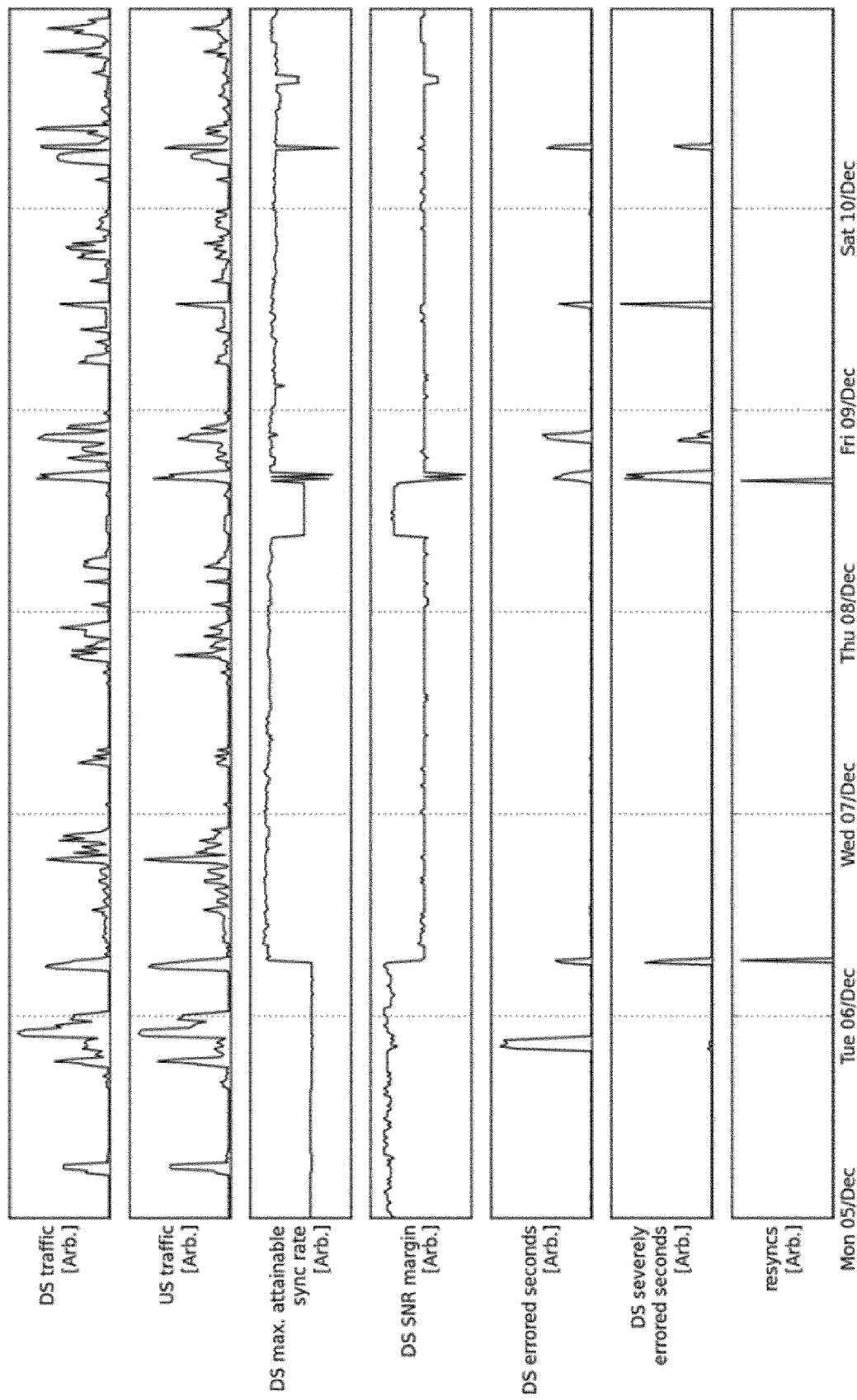
FIG. 3 illustrates data objects for PLTI detection plotted for a six-day period.

The required data objects for PLTI detection are shown in FIG. 3. The top two subplots show DSL traffic (DS and US) over a period of six days. In this case the traffic in both directions is well correlated and shows a pattern of likely human usage. The traffic values sit at near zero for extended periods and occasionally spike when a significant demand is placed on the access network. The third and fourth panels show DS max attainable sync rate and DS SNR Margin respectively. These values give a sense of the current performance of the DSL line, and are related values. It can be seen on Tuesday 6$^{th}$ December that SNR Margin falls at the same point as max. Attainable rises. This behavior is to be expected and shows how rate and margin can be exchanged. The final three charts show counts of errored seconds (seconds with at least one DSL error), counts of severely-errored seconds (seconds with multiple DSL errors) and finally resyncs.

It is worth noting at this point that the mathematical properties of error counts and retrains are fairly similar; generally zero, with short clear spikes. Whereas the behavior of SNR margin and max attainable rate is quite a different archetypal pattern, generally high and real-valued, with a series of minor and major changes, both up and down throughout the time series. This different characteristic behavior requires different analysis methods.

Step s2) Test for high values in traffic, either DS or US through time and set a flag with timestamps where high traffic levels are identified.

The PLTI detection method shown here is based on correlating periods of high traffic with the various other line stress and line condition parameters shown above. The individual traffic vs parameter relationships can be processed in parallel. However, for simplicity the processing of traffic data is extracted as a pre-process which may be re-used multiple times.

This algorithm is designed to work over an entire network estate without requiring manual intervention or configuration on a use-by-use basis. To identify periods of 'high traffic' over a full network it may be determined that traffic levels must be high in absolute terms, relative to other lines and consistent with the range of values of traffic data likely to be seen during mid-to-high usage. It may also be determined that a traffic level must be high in relation to the normal or background traffic data shown on the given line. This allows any lines which have traffic levels which are far too low to pass significant PLT traffic to be excluded from consideration, and may also exclude lines which show consistent high traffic levels with little variation.

Figure 4:
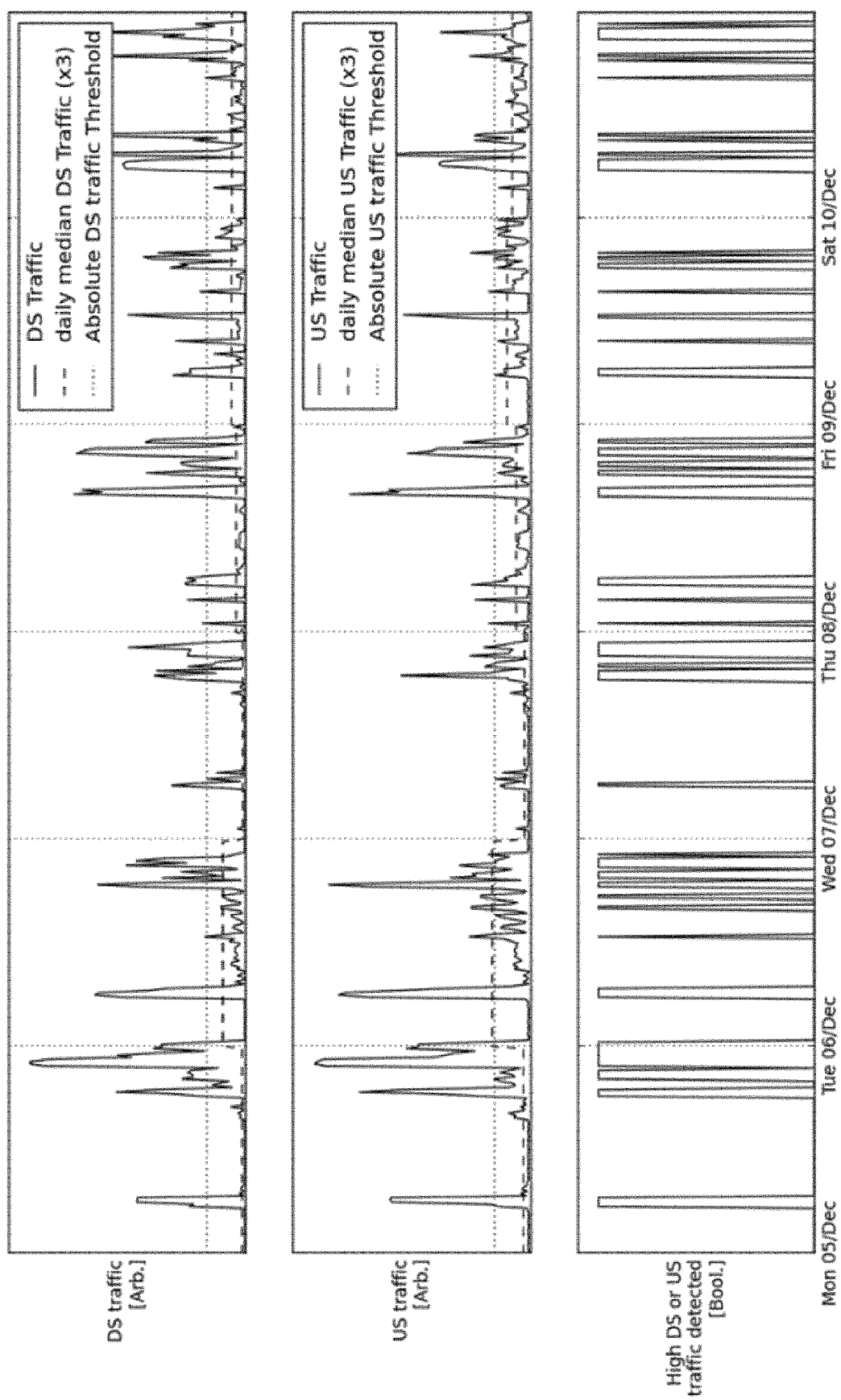
FIG. 4 illustrates detecting time periods of high traffic, using the same data as presented in FIG. 3.

An example calculation is shown in FIG. 4. DS traffic data is shown in the first chart, US traffic data is shown in the second chart and areas of high traffic detection are shown in the third chart.

To perform this assessment, the "local relative high level" of traffic from the daily median traffic is calculated for both the downstream and upstream directions. Since traffic is generally heavily biased towards zeros with only small periods of peak traffic usage, this median value is often very low, generally considerably lower than an arithmetic mean value. As such it is useful if traffic is considerably higher than this median value. To determine this test a traffic threshold is set at a number of multiples (e.g. 3) of the daily median traffic level (dashed lines in FIG. 4). Furthermore, a population-derived "absolute high level" threshold may be set for traffic which encapsulates network-wide levels of high traffic usage (dotted lines in FIG. 4). This could be set in many ways, either by simply picking a high number from data, i.e. from the charts below, or by determining a population-driven statistic, such as the n$^{th}$ percentile of all traffic values in the network for example. The mechanism to determine the threshold for high traffic is reasonably arbitrary.

The test to be performed is to identify the time periods when either downstream or upstream traffic can pass both the "absolute high level" and the "local relative high level" test. As this gives a reasonable guide to suggest the in-home network is likely to be passing data, and if an interfering PLT device is being used, this is when the symptomatic impacts of this technology are likely to be observed.

The output of this process is simply a Boolean array which holds the 'true' and 'false' outcomes for high traffic at each time instance of the various data objects described above. This is shown in the bottom pane of FIG. 4 below and is drawn as True=1, False=0.

Step s3a) Test for high values in DS errored seconds and/or DS severely-errored seconds, and flag where high values in errored second counts are associated with high values in traffic data.

Steps s3a-s3d perform the correlations between high traffic, and impacted DSL stress and capability in the downstream channel, which are non-optional in relation to the present embodiment. Steps s4a-s4c perform the additional, optional correlations. The methodology shown here is repeated for the various data types with considerable shared process.

The tasks performed in steps s3a-s3d and steps s4a-s4c can be performed in parallel using the high traffic outcomes provided above as they do not depend upon one another.

Firstly, periods in time with DS errored seconds and DS severely-errored seconds which correspond to periods of high traffic are identified. Errored second counts represent a channel stress indicator and as such are generally zero-valued. Most lines do not error most of the time, so observed errors are a useful symptomatic identifier of an intermittent line or noise condition affecting the DSL service. However, the embodiment is aiming to identify PLTI only in this algorithm, so is testing for a correlation between high errors and high traffic which indicates that interference is self-generated as a result of in-home networking.

In similar fashion to the high traffic test, a population-wide absolute threshold is applied to DS errored second counts and DS severely-errored second counts, and furthermore a single-line, single-day local threshold is calculated from the DSL line behavior to determine a local threshold of what 'high' errored second counts equates to.

The local threshold is determined as a number (e.g. 2) times the daily median value of DS errored seconds and DS severely-errored seconds, ensuring lines which error continuously throughout time are effectively excluded from this analysis. The population-wide threshold could be set by many methods, ideally a high percentile of the population-wide errored second behavior. However picking an arbitrary value from observed data or by determining service impact of errored second counts could also be used. The essential point here is to have both an absolute high level of errors, and a local high level of errors to improve the likelihood of determining whether PLTI is being generated as a result of high traffic volumes, which is being observed symptomatically as a high errored second count during periods of high DSL traffic.

The final test to be performed is: If either DS errored second counts or DS severely-errored second counts are both locally and globally of "high" value, at the same time as high traffic is observed as per step s2, then set a Boolean value as "true" for this time period.

Figure 5:
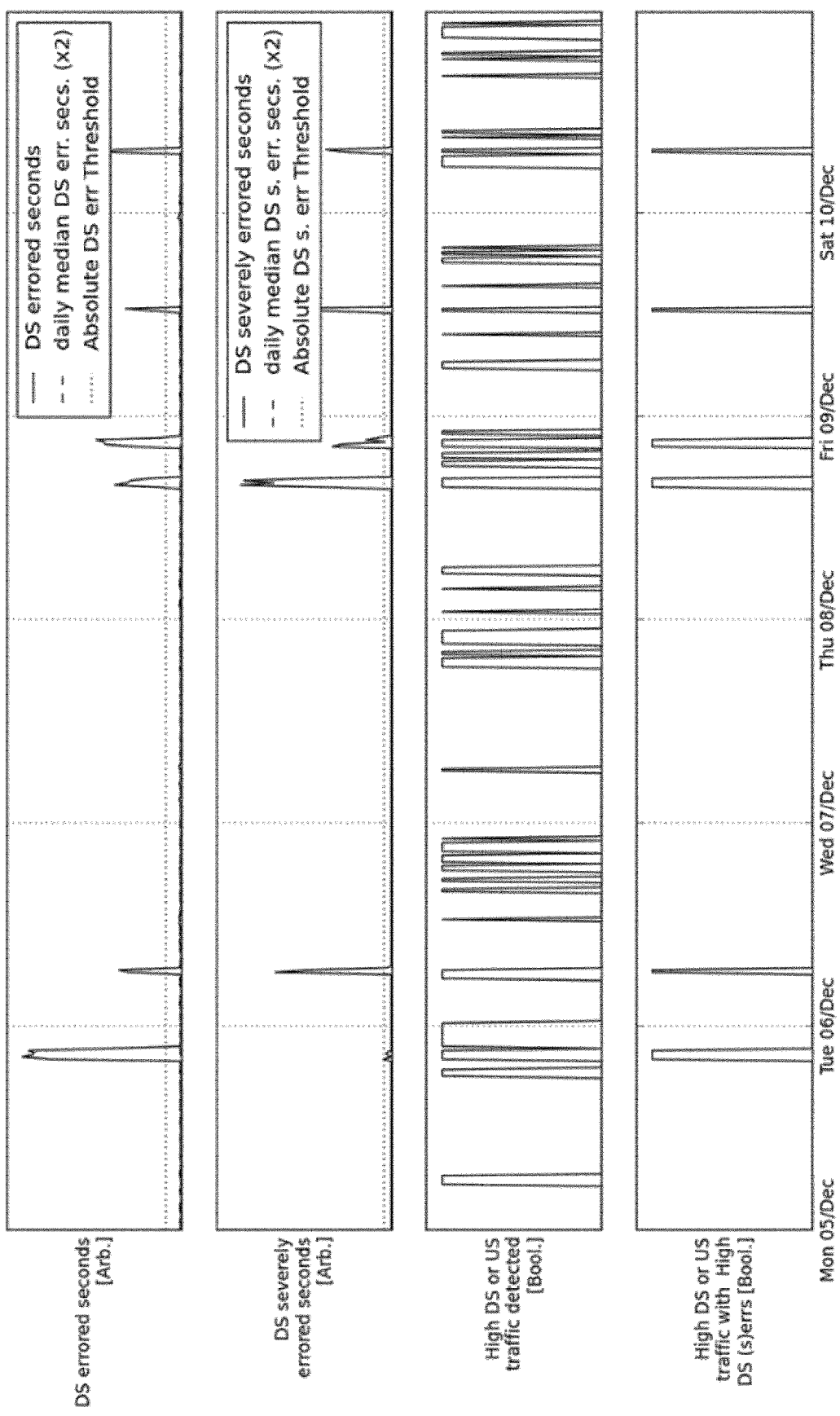
FIG. 5 illustrates detecting time periods of high traffic and DS errors and/or DS severe errors, using the same data as presented in FIG. 3.

An example of this calculation can be seen in FIG. 5 which shows DS errored seconds in the first pane, DS severely-errored seconds in the second pane, the Boolean outcome for 'high traffic' in the third pane and finally the 'high error counts with high traffic' outcome in the fourth pane.

Step s3b) Test for high values in successful resync counts and/or failed resync counts, and flag where high resync counts are associated with high values in traffic data.

The process for determining whether high traffic is associated with successful and failed resync attempts is fundamentally the same as the errored second process outlined above.

As before, resync processes are an indication of line stress. This indicator is a little harder to use than errored seconds as resyncs can be initiated either through user activity (turning off/on a modem), through network operations activity, as a result of a power cut, or due to line stress in the form of interference.

The only major difference is that failed and successful resyncs may be summed to produce a combined attempted resync metric before identifying whether the resync attempt count is both locally and globally of high value. Once again a multiple of median daily resync attempts is calculated and multiplied by a value in the range 2-5 to provide a local resync threshold. This will in many cases be zero anyway, as most lines resync only very rarely. This "local" threshold is only required for DSL lines which are resyncing repetitively and regularly which is unlikely to be due to the time-varying impact of PLTI.

A "global" threshold for high levels of retrains is also required and again this could be calculated by many means. In the case of resync attempts; and the obvious service impact of such an event on a customer during periods of peak traffic usage, it is reasonable to set the global threshold for resync attempts as (1) and identify any resyncs during peak traffic usage as unusual (as this would generally exclude user-initiated resyncs and network operations-initiated resyncs).

Once high resync attempt thresholds are determined the test becomes: Is the resync count both locally and globally high, at the same time as high traffic is detected?

Again the outcome is stored as a Boolean array or value associated with each data timestamp.

Step s3c) Test for reduced values in DS max attainable rates, flag where reduced values in DS max attainable rates are associated with high values in traffic.

The third required correlation test in this embodiment is performed between DS max attainable rates and high traffic. However, the statistical properties of max attainable rates are quite different from the behavior of either errored seconds or resyncs, as can be observed in the data tableau shown in FIG. 3. Max attainable rates are a "channel capability" rather than a "channel stress" indicator.

Figure 6:
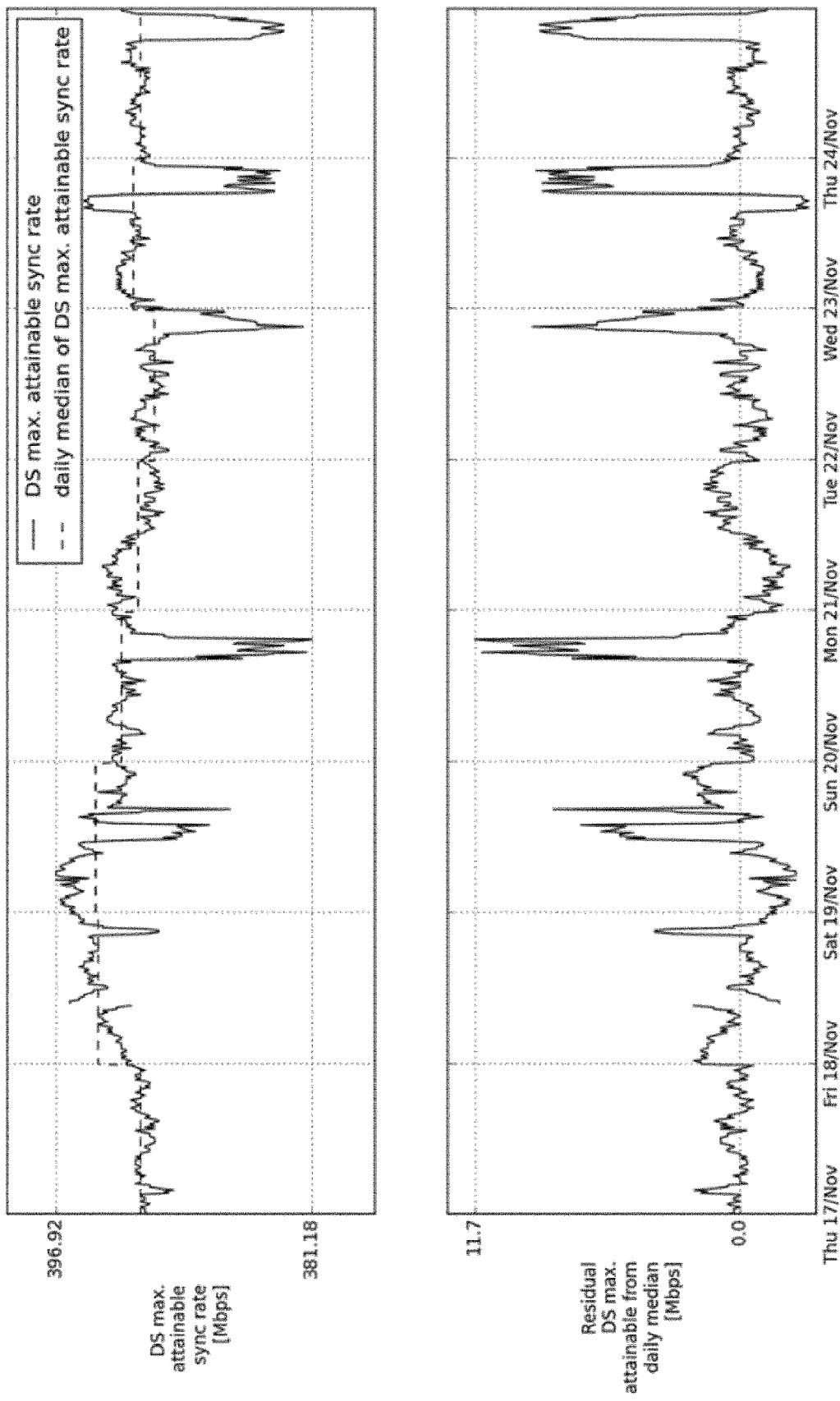
FIG. 6 shows further data illustrating DS max attainable date rates, daily medians and residuals (the data presented in this figure is not from the same example as FIG. 3)

For the vast majority of time the max attainable rate is real-valued, fairly stable and high, with a complex relationship between max attainable rates, signal-to-noise ratio margin, network operation target margin, and overall channel capability. However, during periods of reduced operating capability (impacted signal-to-noise ratio) the max attainable line rate will fall as can be seen in FIG. 6 (noting that the data shown in this figure is from a different line to that shown previous illustrations).

To perform a similar correlation between peaks in a trace and high traffic as has been performed in steps s3a and s3b, a normalized data trace is first prepared which shows the short-term variation in DS max attainable rate separately from the longer-term variations in this value. This is done by calculating the daily median values of DS max attainable rate and calculating the residual value from current value to daily median such that residual[Mbps]=-(max attainable [Mbps]-daily median[Mbps]). This means that the value of residual is positive where max attainable is reduced. This calculation can be seen in FIG. 6 where DS max attainable rate is shown in the top panel (solid line) along with daily medians (dashed line) and residuals are shown in the lower panel. In certain parts of the residual trace this value will be negative, but in general the value is focused on zero with a series of peaks lasting a period of multiple hours. This residual max attainable trace can now be used in the same way as the previous data for errored seconds and resyncs.

The correlation between reduced max attainable rate (increased residual in rate) and high traffic can now be progressed in a similar fashion as previous examples. A global threshold value is determined by analyzing the line population to determine what level of rate-drop should be seen as significant for identifying a significant drop in max attainable rate. In the case of channel capacity metrics of this sort there is little need to ensure a 'local' rate-drop threshold is maintained, as this has effectively been built into the residual calculation in the first place.

The final test for high traffic and a drop in max attainable rate simply becomes: Is residual DS max attainable rate higher than threshold when high traffic is also detected? Once again this value is stored as a Boolean array.

Figure 7:
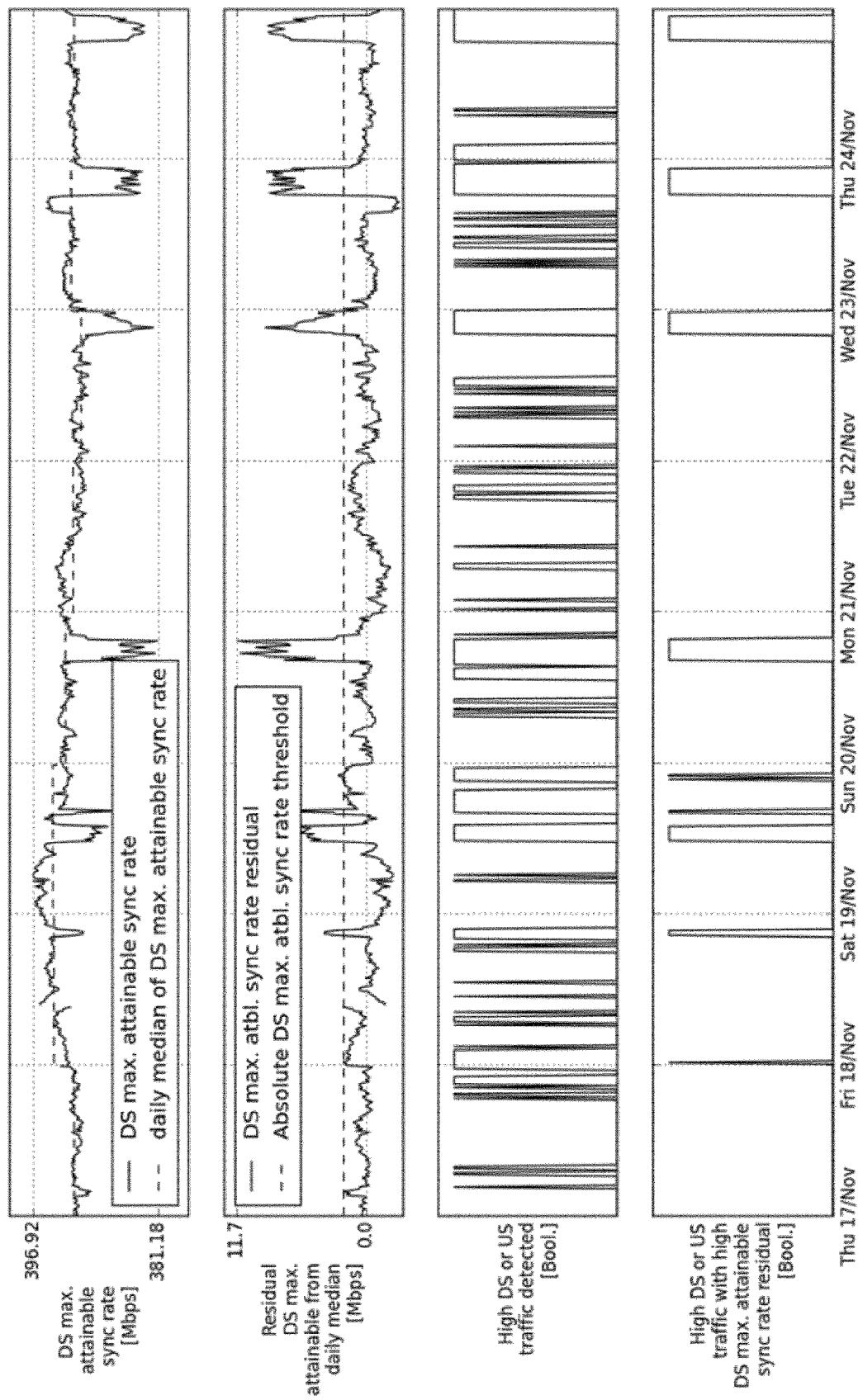
FIG. 7 illustrates detecting time periods of high traffic and reduced DS max attainable rate, using the same data as presented in FIG. 6.

The details of this calculation are shown in FIG. 7 which shows the details of FIG. 6 in the top two panes, alongside high traffic detection in pane 3 and high rate residual and high traffic in pane 4.

Step s3d) Test for reduced values in DS SNR margin, flag where reduced values in DS SNR margin are associated with high values in traffic.

The behavior of signal-to-noise ratio margin (SNRM) is very similar to that of max attainable rates and the calculation to determine periods of high traffic with depressed SNRM is exactly the same as in step sac but with a population-derived threshold for determining a 'large drop in SNRM' used rather than the max attainable threshold value.

Firstly the negative residual must be extracted then a correlation is made between high traffic and depressed SNRM using the residual values.

Again, the outcome of this process would be a Boolean array of "true" or "false" outcomes for high traffic with reduced SNRM.

Step s4a) Optional VDSL only (Test for high values in DS FECS counts, and flag where high values of DS FECS counts are associated with high values in traffic data.)

The previous processes are non-optional in relation to the present embodiment as without analyzing DS error parameters, resync counts, DS maximum attainable rates and DS SNRM it would be possible for some cases of service impacting PLTI to avoid detection due to the complex way DSL services operate and manage the relationships between channel capability and channel stress.

However, a range of other parameters can be used to further enhance this detection mechanism, some of which are only available in VDSL/ADSL and others which are only available in G.fast technologies.

In a VDSL implementation of PLTI detection a further test could be performed on downstream forward error corrected seconds (FECS). The process would be exactly the same as used for either DS errored seconds or DS severely-errored seconds with locally and globally optimized thresholds to indicate elevated levels of DS FECS.

FECS are again a channel stress parameter which shows a DSL error was avoided through forward error correction.

However, this is seen as a non-service-impacting behavior and would only be used to identify the presence of time-correlated traffic with channel stress, not to show the presence of a service-impacting issue.

FECS are generally low- or zero-valued and peak when a line is operating in unfavorable conditions. This is why the correlation mathematics is the same as for errored second behavior.

Step s4b) Optional—G.fast only (Test for high levels DS SRA events, and flag where high levels of DS SRA events are associated with high values in traffic data)

In a G.fast implementation of PLTI detection the margin management technologies used to improve sync stability can be used as indicators of channel stress. Seamless rate adaption (SRA) is used to trade max attainable rate with SNR margin to stabilize line behavior very rapidly when external influencers change the channel capacity of the line. Where high levels of SRA activity are observed it can be concluded that a line is operating under stress. By benchmarking thresholds which represent high levels of SRA activity on a local and global basis this parameter could again be used to identify changes in the line-operating behavior which correlate with high traffic levels. The mathematics of this process would again be the same as used to identify correlated errored seconds with traffic as in step s3a.

SRA events are an indicator of line stress and are not directly service-effecting.

Step s4c) Optional—G.fast only (Test for high levels DS FRA events, and flag where high levels of DS FRA events are associated with high values in traffic data)

In a G.fast implementation of PLTI detection the fast rate adaption (FRA) process can also be used to identify line stress. This process is more severe than SRA and is implemented only to prevent a likely resync. However a successful FRA event is also non-service-effecting and counts of FRA events could be analyzed as above using both a local and global threshold for high levels of FRA activity to correlate with high traffic levels.

Step s5) Optional—(ensure sharp transitions in underlying parameters and screen for singleton correlated events where any of the above flags are not set for more than a single concurrent timestamp).

Having constructed a series of Boolean arrays, one for each parameter which is correlated with traffic as above, it can be useful to refine the outputs to ensure a stable, high-confidence detection of real variation in line-performance over the time-periods for which PLT is likely to be used at a significant level. This is likely to be as a result of some form of Media streaming around the home.

The first recommended but optional process to stabilize detection outputs relates to the detection of PLTI using the two residual calculations outlined in steps s3c and s3d. In the example shown above, max attainable rates vary significantly from one time-bin to another giving clearly different line-behavior before and after a transition. This is to be expected if an interference-generating device is turned off and on or progresses from a quiescent to impactful state. However, this is not always shown in the data and is not the only way the data can be correlated, as on occasion parameters such as max attainable rates and SNRM will vary smoothly over time by a significant amount, but without a clear transition point from state 'A' to state 'B'. In this case it is unlikely this behavior is caused by PLTI and it would not be useful to include such behavior in a detection of PLTI algorithm. To screen against this behavior, the Boolean array of (for example) "large reductions in max attainable rate correlated with high traffic" is taken, and a scan is performed along this array both forward and backward in time. Where a transition is found in the correlation Boolean, from (not-detected or false) to (detected or true), the underlying parameter, DS max attainable rate, is analyzed across this transition. It is determined that the two values of max attainable rate must be significantly different from one another. If these two values, right at the transition from correlated to not-correlated behavior are not significantly different, it is appropriate to override the detection Boolean and set the detected flag to 'not-detected'. This process improves PLTI detection as this excludes any longer-term variations in channel capability such as behavior caused by different temperatures at different times of day, or different external noise levels for example. An example of this process is shown in FIG. 8.

Figure 8:
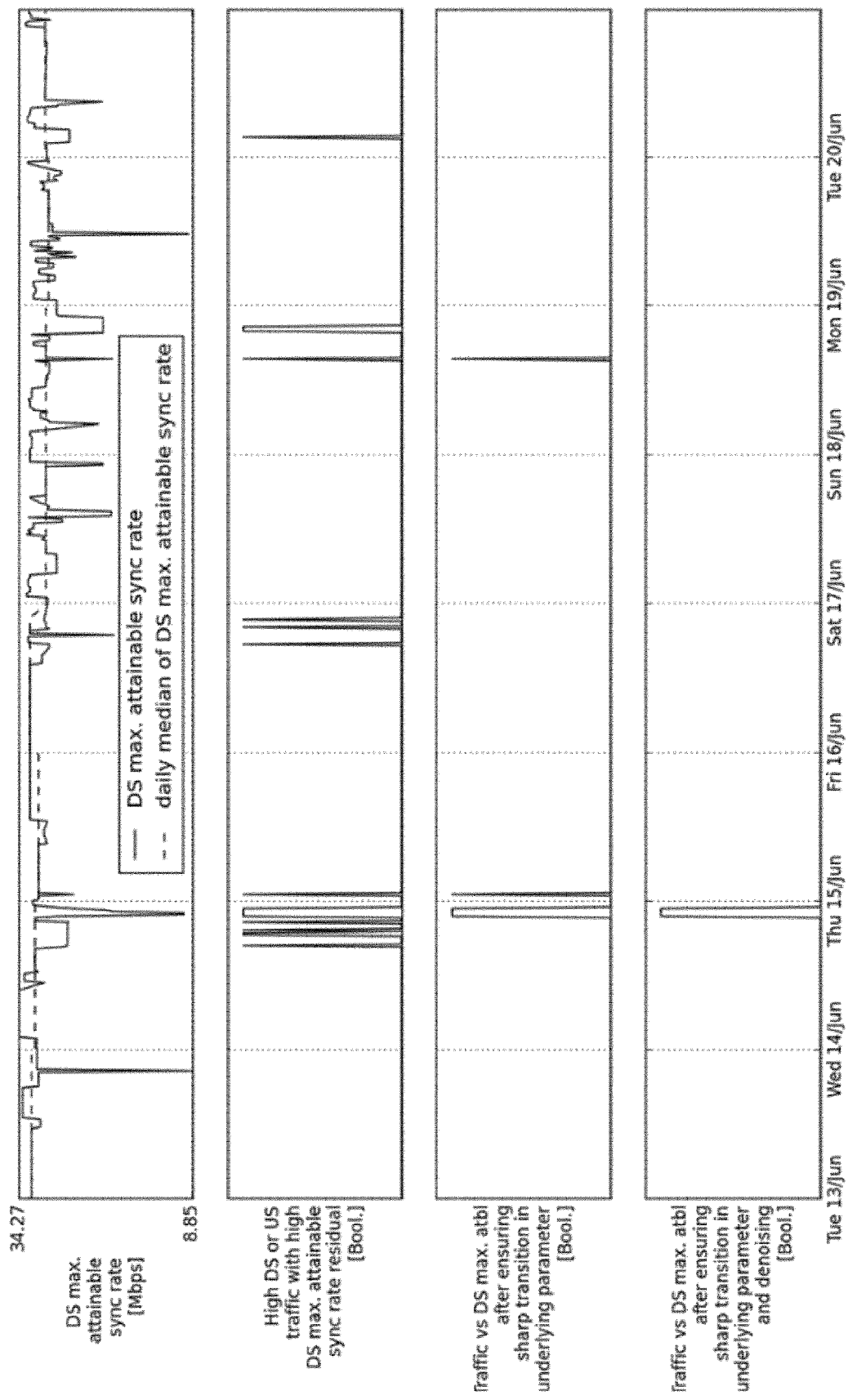
FIG. 8 illustrates ensuring sharp parameter transitions and de-noising Boolean arrays.

FIG. 8 shows an example case of varying DS max attainable rate and the associated daily median of max attainable rate in the top pane. The second pane shows all the instances where traffic on this line (not shown) and the residual of rate vs median rate are high and correlated. The third pane shows the reduction in detection when a significant change is enforced in the underlying DS max attainable rate to maintain a correlation flag. This step significantly reduces the number of detection periods and enforces a much closer coupling between the underlying parameters and detections. This step significantly improves the detection credibility for PLTI as the source of the changing line behavior. This step is not required for the channel stress indicators identified above, only for the channel capacity indicators which require a calculation to generate a residual.

A final outcome de-noising process is recommended to remove single-time instances of correlated behavior across all the correlation Boolean arrays. This is simply because it is expected for most use cases for high levels of PLT to last for over half an hour and it is not useful for the algorithm to be over-sensitive to short time variations in parameters. So, any sections of the Boolean arrays which read [false,true,false] are simply set to [false,false,false]. This process can be seen in the lowest pane of FIG. 8 as an additional step after the removal of non-sharp transitions.

The two steps described above have reduced the series of small correlated time periods to just a single time period in which high traffic correlates with a sharp and significant reduction in DS max attainable rate for an extended time period. This final Boolean array is now ready for further aggregation and analysis.

Step s6) Test across each timestamp for coincident traffic (DS or US) vs (parameters) to determine how many of the (generally) 4 to 7 (or more, where available) related parametric correlations are set at once. Set a mapping to score the related sets of parameter correlations to form timestamp-specific PLTI scores.

Having produced a series of Boolean arrays, one for each set of parameters under investigation, sum the 'True' flags at each timestamp. i.e. if two of the arrays show 'true' at 12:00:00 on a given day and the other arrays show false this gives a single value of two in the output array. This step allows a combination of the various different parameters into a single array.

The purpose of this step is to identify time-correlated evidence of PLTI, not to judge the significance of these impacts. So while it might be tempting to weight the most impactful parameters more highly (such as retrains) and the less impactful parameters less (such as FECS) this may not be the best approach simply for identifying PLTI behavior.

Finally, it can be useful at this point to introduce a non-linear mapping of the summed outcomes, for example if using a four-parameter model for the mandatory fields described above it has proven useful to map the summed outcomes such that 1 is mapped to 1, 2 to 3, 3 to 6 and 4 to 10. i.e. following a triangular series. This has the effect of weighting combined capability and stress outcomes much more highly than if only a single true flag is detected. This will feed into the final PLTI diagnosis in the following steps.

Step s7) Aggregate timestamp PLTI scores for each day of analysis. Where high levels of correlated traffic vs parameter behavior is observed through the day set flag indicating that day shows PLTI.

For each day of assessment, sum all the mapped outcomes from the previous step. Where the daily summation of mapped timestamp outcomes reaches a set threshold identify this day as a PLTI_day. In the case described above, looking for a daily score of 21 or greater, this corresponds to looking for either more than two timestamps with all four identifiers set to true, or four timestamps where 3 of 4 outcomes are true, or any other combination which gives a summation of over 20 from the mapped correlations. This process allows a weighting of the various components which can be produced as a result of traffic correlated line stress or reduce channel capability.

Due to the flexibility of this method, and the choices made about which parameters to study, the final threshold to declare a PLTI_day=True requires tuning and should not be seen as a fixed parameter.

Step s8) Across the analysis time period of at least 3 days, identify if the number of days showing PLTI is significant compared to those days without PLTI. If so, set diagnosis for PLTI as True.

Finally, count the number of PLTI_day=True cases, and compare this with the number of days analyzed. Since PLTI will only be detected when in use we should not expect this result to be particularly high in cases of moderate PLT usage. Again, by comparison with a threshold value, e.g. are there more PLTI days than two/week analyzed then a heavily aggregated analysis of PLTI can be established. Where this case is seen to be true, set a result of PLTI=True and use this as the final diagnosis.

Step s9) Optional—(If PLTI is determined to be True; Assess service impact by separating all analyzed timestamps according to their timestamp specific PLTI scores (high or low), determine whether retrains, and DS errored seconds or DS severely-errored seconds are more prevalent during PLTI event time periods. Or, whether max attainable rates are significantly impacted during PLTI event time periods. If so, extend PLTI detection to include 'service impacting' flag).

Whilst the presence of PLTI has been established in step s8, a further optional step adds significant diagnostic value to this process. This final step is to identify whether the PLTI detected can be identified as service impacting or not.

By taking the summed Boolean array produced in step s6 the analyzed time period can be divided into times where no evidence of PLTI is detected (i.e. summed value=0) and time periods where PLTI is detected (I.e. summed value≠0) over a period of many days.

By considering only the "service-impacting" parameters studied above (resyncs, DS errors, DS severe errors and DS sync rate) it can be determined whether the DSL service is significantly degraded during the periods of PLTI detection.

This is most easily performed by determining the mean resync count per time-window, mean error count per time-window and mean severe error count per time-window during PLTI and without PLTI, then testing for a significant variation between these two conditions.

Errors, severe errors and resyncs are all negative events for line-performance, so if these values increase (relative to PLTI-free times) during PLTI and exceed an absolute threshold it can be determined that PLTI is detected, and this is a service-impacting effect.

Following the methods described above, the presence and impact of PLTI on a DSL line can be determined using only standard DSL reporting statistics provided by DSL modems. This analysis can be performed at the central office of a telecoms provider (or "exchange") without requiring intervention in the field. Furthermore, this analysis method exploits patterns in DSL traffic, this data contains no information about the type of user content being passed over the DSL line and therefore does not create privacy issues.

According to one aspect the invention provides a method of identifying interference on DSL (Digital Subscriber Lines) systems by collecting modem data and determining, for a plurality of time intervals, whether the line is carrying traffic and/or whether there are errors on the line. The presence of interference can be inferred from the correlation of the traffic data and the error data.

As the present invention can be implemented using an appropriately configured and programmed PLOAM or other computing apparatus, appropriate computer code may be accessed via download, for example via the internet from an ISP, or on some physical media, for example, DVD, CD-ROM, USB memory stick, etc. In the preceding discussion reference has been made to copper cables. Historically aluminum was sometimes used as the electrical conductor in access network cables as an alternative to copper. It will be understood that embodiments of the present invention may be of equal applicability to cables regardless of whether the conductors are formed of copper, aluminum or other materials. It will be understood that the copper cables referred to are twisted pair cables, as are conventionally used in telephony networks.

As noted above, as standards evolve, the precise parameters used may be adapted. The scope of the invention is not intended to be limited to specific examples but to be defined by the appended claims, interpreted to give them their full scope of equivalents according to the prevailing law.

The invention claimed is:

1. A method of determining the presence of power-line transmission interference (PLTI) on a digital subscriber line (DSL) connecting a network to a customer premises, the method comprising:

collecting, at a modem via which data carried by the digital subscriber line passes, modem data in respect of data communication on the digital subscriber line, the modem data being collected for a series of time intervals;

determining from the collected modem data at least one traffic measure indicative of data throughput on the digital subscriber line for each time interval;

determining from the collected modem data at least one noise measure indicative of errors or noise in the data carried by the digital subscriber line for each time interval;

correlating the traffic measures and noise measures for a plurality of said time intervals; and determining the presence of power-line transmission interference based on the results of a plurality of said correlations;

wherein time intervals are flagged as considered likely to exhibit power-line transmission interference when a positive correlation above a threshold between the noise measure and the traffic measure is determined.

2. A method according to claim 1 wherein the method is performed based on modem data obtained by the network, and wherein the step of determining the presence of power-line transmission interference relates to the detection of power-line transmission interference originating at the customer premises.

3. A method according to claim 1, wherein the modem data is collected, at least in part, by the network from a head-end modem.

4. A method according to claim 1 wherein the modem data is collected, at least in part, from physical layer operations administration and maintenance (PLOAM) statistics and/or other standard data reported by a modem within the customer premises.

5. A method according to claim 1 wherein the at least one noise measure is determined from at least one reported modem parameter selected from:—
  errored seconds;
  successful and/or unsuccessful resync counts;
  max attainable rate;
  signal-to-noise ratio (SNR) margin.

6. A method according to claim 1 wherein the at least one noise measure is determined based on a plurality of reported modem parameters and/or where a plurality of noise measures are determined.

7. A method according to claim 1 wherein a change in synchronised rate or maximum attainable rate is detected and a reduction in rate is determined to be indicative of noise.

8. A method according to claim 1 wherein the time intervals are generally equal and are between 1 minute and 30 minutes.

9. A method according to claim 1, wherein a digital subscriber line is flagged as likely to be experiencing power-line transmission interference when time intervals are flagged over a plurality of days.

10. A method according to claim 1 wherein parameters for use in correlating said traffic measures and noise measures and/or determining the presence of power-line transmission interference are adjusted based on an independent input indicative of the likelihood of power-line transmission interference at a particular customer premises.

11. A method comprising repeating the method according to claim 1 for a plurality of digital subscriber lines connected to a network and wherein parameters for use in correlating said traffic measures and noise measures and/or determining the presence of power-line transmission interference are adjusted following said repeating.

12. A method according to claim 1 comprising adjusting a DSL profile or parameter for the digital subscriber line and/or sending a signal to a modem to adjust a DSL profile or parameter for the digital subscriber line in response to determining the presence of power-line transmission interference.

13. A non-transitory computer-readable medium storing computer program instructions which upon execution by a computer perform the method according to claim 1.

14. A method according to claim 1 wherein determining the presence of the power-line transmission interference based on the results of the plurality of the correlations includes determining how many of the correlations are set at once.

15. A method of determining the presence of power-line transmission interference (PLTI) on a digital subscriber line (DSL) connecting a network to a customer premises, the method comprising:

collecting, at a modem via which data carried by the digital subscriber line passes, modem data in respect of data communication on the digital subscriber line, the modem data being collected for a series of time intervals;

determining from the collected modem data at least one traffic measure indicative of data throughput on the digital subscriber line for each time interval;

determining from the collected modem data at least one noise measure indicative of errors or noise in the data carried by the digital subscriber line for each time interval;

correlating the traffic measures and noise measures for a plurality of said time intervals; and determining the presence of power-line transmission interference based on the results of a plurality of said correlations;

wherein parameters for use in correlating said traffic measures and noise measures and/or determining the presence of power-line transmission interference are adjusted based on an independent input indicative of the likelihood of power-line transmission interference at a particular customer premises.

16. A system for determining the presence of power-line transmission interference (PLTI) on a digital subscriber line (DSL) connecting a network to a customer premises, the system comprising:

a computer which upon execution of computer program instructions is configured to:

process modem data, collected at a modem via which data carried by the digital subscriber line passes, in respect of data communication on the digital subscriber line, the modem data being collected for a series of time intervals;

determine from the collected modem data at least one traffic measure indicative of data throughput on the digital subscriber line for each time interval;

determine from the collected modem data at least one noise measure indicative of errors or noise in the data carried by the digital subscriber line for each time interval;

correlate the traffic measures and noise measures for a plurality of said time intervals; and determine the presence of power-line transmission interference based on the results of a plurality of said correlations;

wherein parameters for use in correlating said traffic measures and noise measures and/or determining the presence of power-line transmission interference are adjusted based on an independent input indicative of the likelihood of power-line transmission interference at a particular customer premises.

17. A system for determining the presence of power-line transmission interference (PLTI) on a digital subscriber line (DSL) connecting a network to a customer premises, the system comprising:

a computer which upon execution of computer program instructions is configured to:

process modem data, collected at a modem via which data carried by the digital subscriber line passes, in respect of data communication on the digital subscriber line, the modem data being collected for a series of time intervals;

determine from the collected modem data at least one traffic measure indicative of data throughput on the digital subscriber line for each time interval;

determine from the collected modem data at least one noise measure indicative of errors or noise in the data carried by the digital subscriber line for each time interval;

correlate the traffic measures and noise measures for a plurality of said time intervals; and determine the presence of power-line transmission interference based on the results of a plurality of said correlations;

wherein time intervals are flagged as considered likely to exhibit power-line transmission interference when a positive correlation above a threshold between the noise measure and the traffic measure is determined.

18. A system according to claim 17, wherein the computer is further configured to flag a digital subscriber line as likely to be experiencing power-line transmission interference when time intervals are flagged over a plurality of days.

19. A system according to claim 17, wherein the computer is further configured to determine how many of the correlations are set at once in order to determine the presence of the power-line transmission interference based on the results of the plurality of the correlations.

* * * * *